Figure 1:
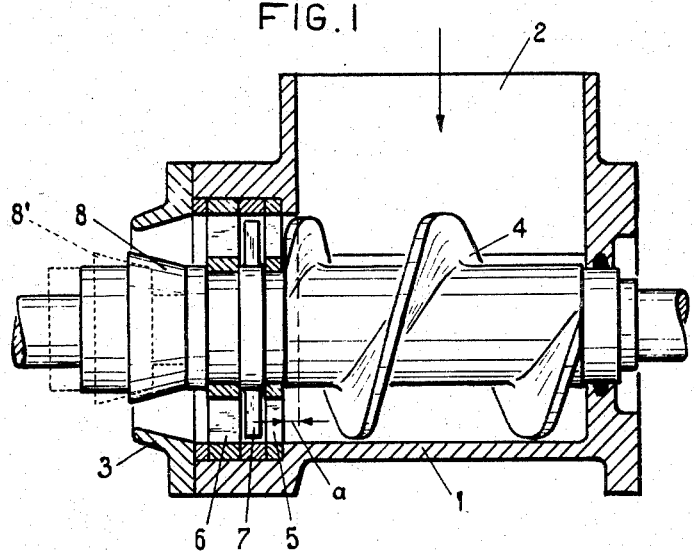

June 16, 1959     H. J. BONDA     2,890,956
METHODS AND APPARATUS FOR PRETREATING GREEN FODDER
Filed July 18, 1956

# United States Patent Office 2,890,956
Patented June 16, 1959

2,890,956
METHODS AND APPARATUS FOR PRETREATING GREEN FODDER

Hendrikus J. Bonda, Leiden, Netherlands, assignor to Bonda's Veevoederbureau N.V., Leiden, Netherlands Application July 18, 1956, Serial No. 598,634

Claims priority, application Netherlands July 26, 1955

1 Claim. (Cl. 99—8)

The invention relates to methods for pretreating green fodder.

With known ensiling methods, valuable nutrient substances are lost by juice draining away in the silo.

An object of the invention is to provide for avoiding the loss of these nutrient substances and to this end according to the invention the water content of bruised material is reduced to 72% to 76% by weight by adding a dry substance during the pretreatment of the material to be ensiled. By reducing the moisture content to within the limits mentioned above, all juices are retained with the material and do not draw away from the material in the silo so that losses are avoided. Also the advantage is obtained that the fermentation of the material is rapidly and safely effected.

In accordance with the method according to the invention, a dry substance for reducing the water content of the material under treatment may be added after the bruising step or during the bruising and lacerating steps, so that the liberated juice is then immediately bound to the dry substance.

With the method according to the invention, heavy bruising or crushing and a reduction of the moisture content to 72% to 76% are of vital importance. The bruising or crushing step should be carried out in such a manner that many cells are crushed so that a sufficient quantity of juice is liberated to cover the material and immediately take part in the fermentation process, so as to ensure a rapid fermentation of the material. Such a bruising or crushing step will generally be accompanied by an intensive division of the material and, if a large number of cells have mechanically been destroyed, the material is readily comminuted. Such a comminution is not essential for the purpose of the pretreatment according to the invention but on the other hand it does not constitute a disadvantage, as juice is liberated, so that bruising and comminution together require less power than a comparable bruising step alone. A comminution also presents the advantage that the material may more readily be mixed and compressed. With such a compression, very little air remains entrapped in the material and only small losses due to respiration can occur. Consequently, pretreatment according to the invention has also the advantage that the material stored in a silo substantially does not decrease in volume, so that silo extensions are not required when filling the same. Further, the mass is very compact.

According to the invention, all of the freed juices are retained with the bruised comminuted material by the addition of the quantity of dry substance required for reducing the water content of the material to be ensiled to the desired value of 72% to 76% by weight. The dry substance to be added to the material or to the juice can be any material suitable for use as cattle food, such as dried potato-fibres, dried pulp of beetroots, dried grass, dried malt germs, and so forth. Said addition presents the advantage that it renders it possible to control the composition of the ensiled fodder.

If desired, a small quantity of a substance containing soluble and therefore rapidly fermentable carbohydrates, such as molasses may be added to the material to be ensiled. Such an addition may be added before, during or after the mechanical treatment of the fodder.

In accordance with the invention, the mechanical treatment such as the bruising, comminuting and squeezing operations may be efficiently affected in a single machine. Thus, said machine comprises a conveying screw located in a casing provided with an inlet opening, one or more stationary grids being arranged in the casing at the delivery end of the conveying screw and said grids being adjacent a narrowing discharge nozzle. The conveying screw forces the material through the openings in the grids, so that it is crushed and lacerated. By varying the area of the discharge nozzle, the final pressure and thus the degree of squeezing of the material can be adjusted. If it is desired to have the juice draining away from the machine the wall of the casing is providing with holes.

In order to further the bruising and disintegration of the material, rotating knives may be arranged in front of, between or behind the grids.

In the treatment of elongated material such as grass and lucerne, difficulties can arise if the long stalks stick to the screw and form a wad so that the screw ceases to convey.

According to the invention, this drawback may be avoided by mounting a grid at a distance not exceeding a few centimetres from the inlet opening of the casing. With said arrangement, there is no real pressure chamber and the screw can regularly convey the material through the grid.

Figure 2:
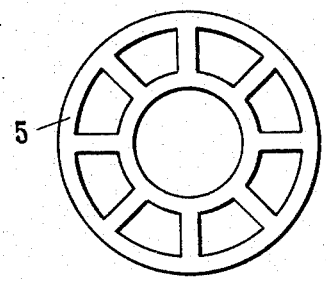

In the accompanying drawing, which illustrates a device for carrying out the method according to one embodiment of the invention, Fig. 1 shows a diagrammatical sectional elevation of the device and Fig. 2 shows a grid.

In the casing 1, which has an inlet opening 2 and a conical discharge nozzle 3, a conveying screw 4 is mounted. The pitch of said screw may decrease towards the discharge end of the casing. Between the discharge 3 and the screw 4, two grids 5 and 6 are arranged and the foremost grid 5 is located closely adjacent the inlet opening 2. The bars of the grids which may be radially directed, are sharp on their respective sides facing the inlet opening 2 of the casing, so that the material is not only bruised, but cut. For cutting the material also knives 7 may be secured on the shaft of the screw 4 between the grids.

As the grid 5 is located at the inlet opening 2 or at a distance not exceeding a few centimetres beyond said opening, the material caught by the screw is regularly forced through the grids 5 and 6, so that no wad can be formed on the screw. The screw may have, for example, a diameter of 12 to 14 inches and the distance $a$ of the grid to the inlet opening is then about ¾ to 1¼ inch, so that said distance does generally not exceed 1/10 of the diameter of the screw.

In the discharge nozzle 3, a cone 8 is located, said cone being axially slidable for varying the discharge area. The cone 8 may be brought to the dotted line position 8'.

What I claim is:

A method for processing green fodder material comprising mechanically bruising and comminuting the material to crush a large number of cells thereof and to cover the material with its juices, adding a dry substance to the material for retaining the freed juices and lowering the moisture content of the mixture to 72–76% by weight, and ensiling the material thus treated.

References Cited in the file of this patent

UNITED STATES PATENTS

| | | |
|---|---|---|
| 1,703,782 | Schmidt | Feb. 26, 1929 |
| 2,162,922 | Schmidt | June 30, 1939 |
| 2,314,993 | Langrish | Mar. 30, 1943 |
| 2,386,052 | Lundy | Oct. 2, 1945 |
| 2,731,995 | Sutherland et al. | Jan. 24, 1956 |

FOREIGN PATENTS

| | | |
|---|---|---|
| 694,547 | Great Britain | July 22, 1953 |